United States Patent
Kadu

(10) Patent No.: US 12,500,637 B2
(45) Date of Patent: Dec. 16, 2025

(54) SYSTEM AND METHOD FOR GROUP PROBABILITY-BASED PREFIX MODIFICATION OF KNOWN SYMBOL PROBABILITY DISTRIBUTIONS

(71) Applicant: Samsung Display Co., Ltd., Yongin-si (KR)

(72) Inventor: Harshad Kadu, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 162 days.

(21) Appl. No.: 18/489,615

(22) Filed: Oct. 18, 2023

(65) Prior Publication Data

US 2025/0070832 A1    Feb. 27, 2025

Related U.S. Application Data

(60) Provisional application No. 63/534,714, filed on Aug. 25, 2023.

(51) Int. Cl.
*H04B 7/0456* (2017.01)
*H04B 7/06* (2006.01)

(52) U.S. Cl.
CPC .......... *H04B 7/0478* (2013.01); *H04B 7/063* (2013.01)

(58) Field of Classification Search
CPC ... H04B 7/0478; H04B 7/063; H03M 7/4075; H03M 7/6005; H03M 7/6011; H03M 7/6017; H04N 19/13
See application file for complete search history.

(56) References Cited

U.S. PATENT DOCUMENTS

| | | | |
|---|---|---|---|
| 9,513,813 B1 | 12/2016 | Blaettler et al. | |
| 10,057,580 B2 | 8/2018 | Hsiang | |
| 10,735,025 B2 | 8/2020 | Bennett et al. | |
| 10,855,989 B2 | 12/2020 | Thirumalai et al. | |
| 10,862,509 B1 | 12/2020 | Heil et al. | |
| 10,904,532 B2 | 1/2021 | Thirumalai | |
| 2016/0044339 A1 | 2/2016 | Sung | |
| 2016/0336958 A1* | 11/2016 | Henry | G06F 16/2365 |
| 2020/0036979 A1 | 1/2020 | Thirumalai | |
| 2022/0083282 A1* | 3/2022 | Sumiyoshi | G06F 3/0673 |
| 2022/0311452 A1 | 9/2022 | Rupasinghe et al. | |
| 2022/0416810 A1* | 12/2022 | Marpe | H03M 7/55 |

* cited by examiner

*Primary Examiner* — Omeed Alizada

(74) *Attorney, Agent, or Firm* — Lewis Roca Rothgerber Christie LLP

(57) ABSTRACT

A method may include receiving symbol probabilities from a dataset, and computing a group probability for each group of symbols in a first codebook based on the received symbol probabilities. The method may further include determining that a first group probability of a first group in the first codebook is lower than a second group probability of a second group in the first codebook, swapping a first prefix corresponding to the first group with a second prefix corresponding to the second group in response, and storing the first prefix corresponding to the second group and the second prefix corresponding to the first group in a second codebook.

20 Claims, 7 Drawing Sheets

| Symbol | Group | Prefix | Suffix (length) |
|---|---|---|---|
| $S_0 \sim S_1$ | 0 | 0 | x (1) |
| $S_2 \sim S_5$ | 1 | 10 | xx (2) |
| $S_6 \sim S_{13}$ | 2 | 110 | xxx (3) |
| $S_{14} \sim S_{29}$ | 3 | 1110 | xxxx (4) |
| $S_{30} \sim S_{61}$ | 4 | 11110 | xxxxx(5) |
| $S_{62} \sim S_{125}$ | 5 | 111110 | xxxxxx(6) |
| $S_{126} \sim S_{253}$ | 6 | 1111110 | xxxxxxx(7) |
| $S_{254} \sim S_{255}$ | 7 | 1111111 | xxxxxxxx(8) |

| Symbol | Group | Prefix | Suffix (length) |
|---|---|---|---|
| $s_0 \sim s_1$ | 0 | 0 | x (1) |
| $s_2 \sim s_5$ | 1 | 10 | xx (2) |
| $s_6 \sim s_{13}$ | 2 | 110 | xxx (3) |
| $s_{14} \sim s_{29}$ | 3 | 1110 | xxxx (4) |
| $s_{30} \sim s_{61}$ | 4 | 11110 | xxxxx (5) |
| $s_{62} \sim s_{125}$ | 5 | 111110 | xxxxxx (6) |
| $s_{126} \sim s_{253}$ | 6 | 1111110 | xxxxxxx (7) |
| $s_{254} \sim s_{255}$ | 7 | 1111111 | xxxxxxxx (8) |

FIG. 1

| Symbols |
|---|
| $s_0$ |
| $s_1$ |
| $s_2$ |
| $s_3$ |
| ... |
| $s_{254}$ |
| $s_{255}$ |

$F(\cdot)$ →

| Ranks | Group | Prefix | Suffix (length) |
|---|---|---|---|
| 0~1 | 0 | 0 | x (1) |
| 2~5 | 1 | 10 | xx (2) |
| 6~13 | 2 | 110 | xxx (3) |
| 14~29 | 3 | 1110 | xxxx (4) |
| 30~61 | 4 | 11110 | xxxxx (5) |
| 62~125 | 5 | 111110 | xxxxxx (6) |
| 126~253 | 6 | 1111110 | xxxxxxx (7) |
| 254~255 | 7 | 1111111 | xxxxxxxx (8) |

FIG. 2

| Symbols |
|---|
| $s_0$ |
| $s_1$ |
| $s_2$ |
| $s_3$ |
| ... |
| $s_{254}$ |
| $s_{255}$ |

$F(\cdot)$ →

| Ranks | Group | Prefix | Suffix (length) |
|---|---|---|---|
| 0~1 | 0 | 0 | x (1) |
| 2~5 | 1 | 10 | xx (2) |
| 6~13 | 2 | 110 | xxx (3) |
| 14~29 | 3 | 1110 | xxxx (4) |
| 30~61 | 4 | 11110 | xxxxx (5) |
| 62~125 | 5 | 111110 | xxxxxx (6) |
| 126~253 | 6 | 1111110 | xxxxxxx (7) |
| 254~255 | 7 | 1111111 | xxxxxxxx (8) |

FIG. 3

| Symbols |
|---|
| $s_0$ |
| $s_1$ |
| $s_2$ |
| $s_3$ |
| ... |
| $s_{254}$ |
| $s_{255}$ |

$F(\cdot)$ →

| Ranks | Group | Prefix | Suffix (length) |
|---|---|---|---|
| 0~1 | 0 | 0 | x (1) |
| 2~5 | 1 | 10 | xx (2) |
| 6~13 | 2 | 1110 | xxx (3) |
| 14~29 | 3 | 11110 | xxxx (4) |
| 30~61 | 4 | 110 | xxxxx (5) |
| 62~125 | 5 | 111110 | xxxxxx (6) |
| 126~253 | 6 | 1111110 | xxxxxxx (7) |
| 254~255 | 7 | 1111111 | xxxxxxxx (8) |

FIG. 4

| Symbols |
|---|
| $s_0$ |
| $s_1$ |
| $s_2$ |
| $s_3$ |
| ... |
| $s_{254}$ |
| $s_{255}$ |

$F(\cdot)$ →

| Ranks | Group | Prefix | Suffix (length) |
|---|---|---|---|
| 0~1 | 0 | 0 | x (1) |
| 2~5 | 1 | 100 | xx (2) |
| 6~13 | 2 | 111010 | xxx (3) |
| 14~29 | 3 | 111011 | xxxx (4) |
| 30~61 | 4 | 110 | xxxxx (5) |
| 62~125 | 5 | 1111001 | xxxxxx (6) |
| 126~253 | 6 | 1111110 | xxxxxxx (7) |
| 254~255 | 7 | 1111111 | xxxxxxxx (8) |

FIG. 5

SYSTEM AND METHOD FOR GROUP PROBABILITY-BASED PREFIX MODIFICATION OF KNOWN SYMBOL PROBABILITY DISTRIBUTIONS

CROSS-REFERENCE TO RELATED APPLICATION(S)

This application claims the priority benefit under 35 U.S.C. § 119(e) of U.S. Provisional Application No. 63/534,714, filed on Aug. 25, 2023, the disclosure of which is incorporated by reference in its entirety as if fully set forth herein.

FIELD

The disclosure generally relates to entropy coding. More particularly, the subject matter disclosed herein relates to improvements to a system and a method for group probability-based prefix modification of known symbol probability distributions.

SUMMARY

In digital signal processing, data (which may also be referred to as a "symbol") is often encoded (e.g., into binary bit) by an encoder before being transmitted by a transmitter, and then decoded by a decoder upon receiving the encoded signal by a receiver. Electronic devices such as cellular phones, televisions, and other audio or video devices often utilize such digital signals when transmitting them between one device and another and/or even within the device itself, for example, transmitting a digital signal from one part of the device to another part of the same device. To effectively and efficiently transmit the digital signal, the encoding process may include compressing the digital signal such that fewer number of bits may be used to represent the original data.

Entropy encoding is a coding technique for digital signal processing that assigns a binary code to a symbol based on a probability of occurrence of that symbol. Some entropy coding techniques use binary code that can be represented by a combination of prefix and suffix, where the prefixes may be unique and the corresponding suffixes may have a fixed length. In the present disclosure, these codes may be referred to as prefix-suffix entropy codes and may include entropy codes such as, exponential Golomb codes, Elias gamma/delta/omega codes, Levenstein codes, etc.

Similarly, entropy decoding is a technique for decoding binary codes that were encoded by utilizing entropy encoding techniques mentioned above. Therefore, a decoder may decode a prefix-suffix entropy coded signal received from a transmitter.

According to a first embodiment of the present disclosure, a method may include: receiving, by a processor, symbol probabilities from a dataset; computing, by a processor, a group probability for each group of symbols in a first codebook based on the received symbol probabilities; determining, by a processor, that a first group probability of a first group in the first codebook is lower than a second group probability of a second group in the first codebook; swapping, by a processor, a first prefix corresponding to the first group with a second prefix corresponding to the second group in response; and storing, by the processor, the first prefix corresponding to the second group and the second prefix corresponding to the first group in a second codebook.

The second codebook may be a modified codebook in an encoder, the method further including entropy encoding a symbol based on the modified codebook in the encoder.

A rank of the first group may be lower than a rank of the second group.

The second codebook may be a modified codebook in a decoder, the method further including decoding an entropy encoded codeword based on the modified codebook in the decoder.

As a consequence of the swapping, the first prefix may correspond to the second group and the second prefix corresponds to the first group.

The method may further including: determining, after the swapping the first prefix corresponding with the first group with the second prefix corresponding with the second group, that the first group probability of the second group is lower than a third group probability of a third group in the second codebook; and swapping the first prefix corresponding to the second group with a third prefix corresponding to the third group in response.

A rank of the second group may be lower than a rank of the third group.

The first codebook may include prefix-suffix codewords corresponding to symbols.

The dataset may be a training dataset including known symbol probabilities, and the received symbol probabilities include the known symbol probabilities.

According to a second embodiment of the present disclosure, a system may include: a memory; and a processor configured to execute instructions stored in the memory to perform operations including: receiving symbol probabilities from a dataset; computing a group probability for each group of symbols in a first codebook based on the received symbol probabilities; determining that a first group probability of a first group in the first codebook is lower than a second group probability of a second group in the first codebook; and swapping a first prefix corresponding to the first group with a second prefix corresponding to the second group in response; and storing the first prefix corresponding to the second group and the second prefix corresponding to the first group in a second codebook.

The second codebook may be a modified codebook in an encoder, the operations further including entropy encoding a symbol based on the modified codebook in the encoder.

A rank of the first group may be lower than a rank of the second group.

The second codebook may be a modified codebook in a decoder, the operations further including decoding an entropy encoded codeword based on the modified codebook in the decoder.

As a consequence of the swapping, the first prefix corresponds to the second group and the second prefix corresponds to the first group.

The operations further include: determining, after the swapping the first prefix corresponding with the first group with the second prefix corresponding with the second group, that the first group probability of the second group is lower than a third group probability of a third group in the second codebook; and swapping the first prefix corresponding to the second group with a third prefix corresponding to the third group in response.

A rank of the second group may be lower than a rank of the second group.

The first codebook may include prefix-suffix codewords corresponding to symbols.

The dataset may be a training dataset including known symbol probabilities, and the received symbol probabilities include the known symbol probabilities.

According to a third embodiment of the present disclosure, a computer-readable medium may storing instructions that, when executed by a processor, cause the processor to perform a method including: receiving symbol probabilities from a dataset; computing a group probability for each group of symbols in a first codebook based on the received symbol probabilities; determining that a first group probability of a first group in the first codebook is lower than a second group probability of a second group in the first codebook; swapping a first prefix corresponding to the first group with a second prefix corresponding to the second group in response; and storing the first prefix corresponding to the second group and the second prefix corresponding to the first group in a second codebook.

As a consequence of the swapping, the first prefix may correspond to the second group and the second prefix corresponds to the first group, the method further including: determining, after the swapping the first prefix corresponding with the first group with the second prefix corresponding with the second group, that the first group probability of the second group is lower than a third probability of a third group in the second codebook; and swapping the first prefix corresponding to the second group with a third prefix corresponding to the third group in response.

BRIEF DESCRIPTION OF THE DRAWINGS

In the following section, the aspects of the subject matter disclosed herein will be described with reference to exemplary embodiments illustrated in the figures, in which:

FIG. 1 is an illustration of an example codebook for the 256 symbols.

FIG. 2 is an illustration of an example existing codebook that may be modified according one or more embodiments of the present disclosure.

FIGS. 3-4 are illustrations of an example the existing codebook that is modified according one or more embodiments of the present disclosure.

FIG. 5 is an illustration of another example existing codebook that may be modified according one or more embodiments of the present disclosure.

DETAILED DESCRIPTION

Figure 6:
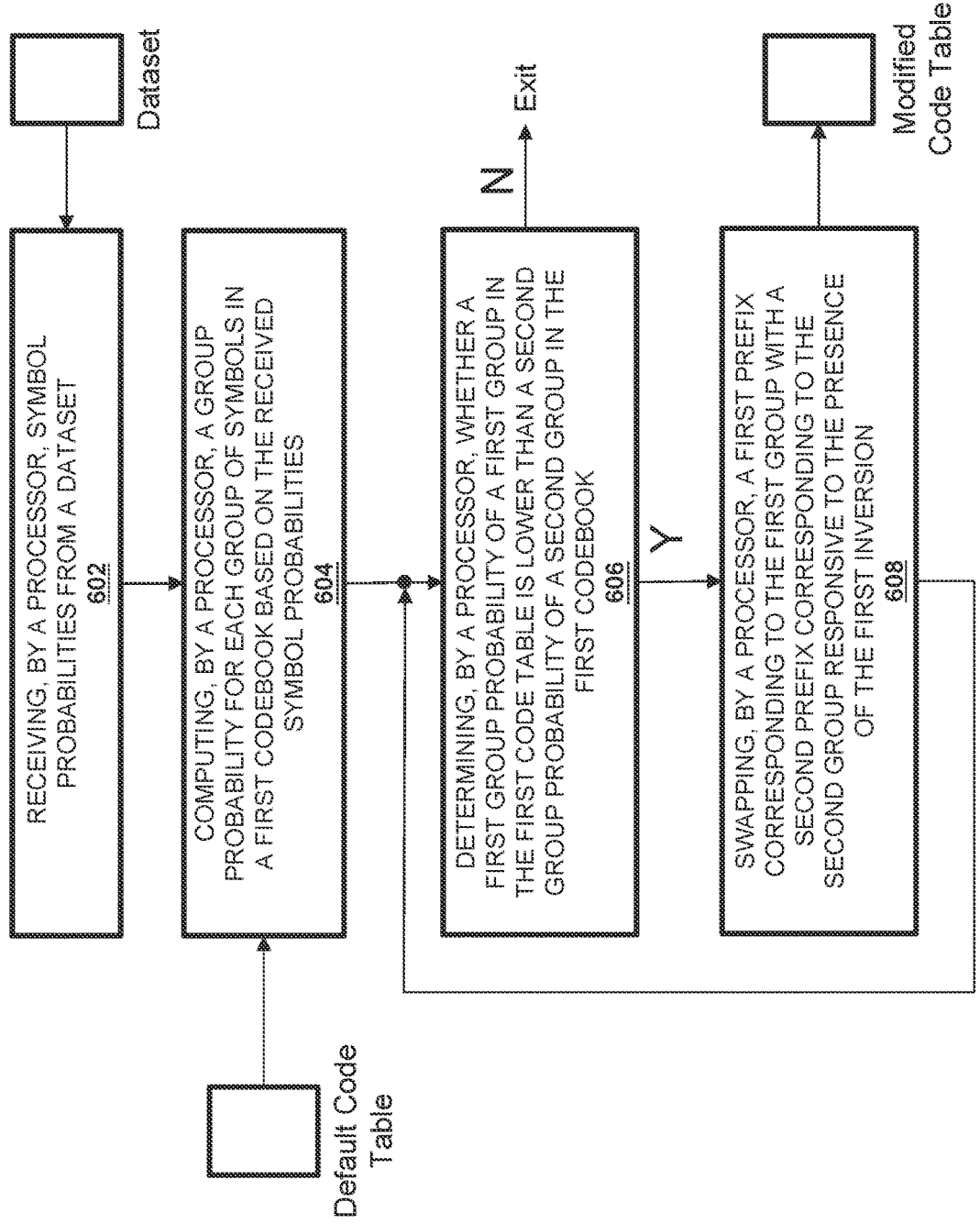
FIG. 6 is a flow chart illustrating a method for modifying the codebook according to one or more embodiments of the present disclosure.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

In one or more embodiments of the present disclosure, techniques will be described to further reduce the number of bits utilized by these prefix-suffix entropy codes. For purposes of explaining the various features of the present disclosure, a codebook for 256 symbols using truncated exponential Golomb codes will be utilized. The symbols may be represented as $s_0$-$s_{255}$ and grouped into 8 groups, 0-7. It should be noted that although the codebook utilized in the present disclosure to describe various example embodiments includes 256 symbols, the inventive concept is not limited thereto and may be applicable to other codebooks having any number of symbols such as 512 symbols, 1024 symbols, etc.

FIG. 1 is a table that illustrates an example codebook for the 256 symbols described above. It may be assumed for simplicity in FIG. 1 that the probability (i.e., probability or frequency of occurrence) of $s_0$ is higher than or equal to the probability of $s_1$. Therefore, for example, the probability of $s_1$ is higher than or equal to the probability of $s_2$, the probability of $s_2$ is higher than or equal to the probability of $s_3$, and so on. As shown, a group of symbols are sorted or assigned to a group, and each group has a unique prefix that is shared by all symbols in that group. Thus, for example, all symbols in group 0 (i.e., symbols $s_0$-$s_1$) have a prefix 0, all symbols in group 1 (i.e., symbols $s_2$-$s_5$ have a prefix 10, and all symbols in group 2 (i.e., symbols $s_6$-$s_{13}$) have a prefix 110, and so on. However, the suffixes for each symbol are unique to each symbol even if the symbols are in the same group. Accordingly, every symbol has a unique binary code. Furthermore, although each suffix is unique, the suffixes for the symbols belonging to the same group are all comprised of the same number of bits. In other words, the bit length of the suffix is the same for all symbols in the same group. For example, the suffix for the symbols in group 0 have a length of 1 (i.e., 1 bit), the suffix for the symbols in group 1 have a length of 2 (i.e., 2 bits), the suffix for the symbols in group 2 have a length of 3 (i.e., 3 bits), and so on.

Additionally, the suffixes for the symbols are sequential such that the first symbol in a particular group has a suffix corresponding to a first binary number in that group and the last symbol in that particular group has a suffix corresponding to the last binary number in that group. For example, in group 0, so is the first symbol so the corresponding suffix is 0 and $s_1$ is the last symbol in this group so that corresponding suffix is 1. In group 1, $s_2$ is the first symbol so the corresponding suffix is 00, $s_3$ is the second symbol so the corresponding suffix is 01, $s_4$ is the third symbol so the corresponding suffix is 10, and $s_5$ is the fourth (and the last) symbol of this group so the corresponding suffix is 11. Thus, the code for the symbol is the combination of the prefix and the suffix as shown in the table. So for example, the code for symbol so is 00 (i.e., prefix=0; suffix=0), and the code for symbol $s_1$ is 01 (i.e., prefix=0; suffix=1).

However, these prefix-suffix codes assume a certain probability distribution for the symbols. For example, exponential Golomb codes assume a geometric distribution for the symbols. Therefore, these codes may perform well if the symbols have an actual geometric distribution. However, exponential Golomb codes may be used on data that may not necessarily have a geometric distribution, thus leading to suboptimal binary codes. The same can be said for other prefix-suffix coding techniques, such as Elias gamma/delta/omega codes. Accordingly, it is desirable to improve entropy coding techniques.

One or more embodiments of the present disclosure are directed to modifying the prefixes of these prefix-suffix coding techniques while leaving the suffixes unchanged, such that the assignment of the binary codes to the symbols is more optimal for the actual probability distribution of the symbols. The modified prefixes may be updated and stored in the codebook in an encoder, thus improving the entropy encoding. Furthermore, the updated codebook may also be stored in a decoder so that the decoder may decode the binary codes. Accordingly, for purposes of this disclosure, it is assumed that the actual probability of the symbols is known, for example, because a dataset of the symbols may be obtained from a training dataset that has a known probability. The process by which the actual probability is determined is not relevant to the embodiments of the present disclosure and therefore will be omitted.

According to one or more embodiments of the present disclosure, a default codebook may be modified or replaced with a new codebook, for example, when a codebook is implemented in an encoder of an electronic device during a manufacturing process. Similarly, the same new codebook may be implemented in a decoder of the same electronic device or another electronic device during the manufacturing process so that the encoded signal may be appropriately decoded.

According to one or more embodiments of the present disclosure, techniques and methods for generating the new codebook will be described. FIG. 2 illustrates one such example default codebook that may be modified according to the various embodiments of the present disclosure. Thus, to generate the new codebook, a training dataset may be utilized, and therefore the probabilities for each symbol may be calculated from the frequency of occurrence and therefore are known. The symbols $s_i$ may be ranked $r_i$ according to a descending order of their probabilities using a forward lookup table (LUT) $F(\cdot):r_i=F(s_i)$ that converts symbols to ranks. Furthermore, the probability of symbol $s_i$ may be represented by $p_i$. Therefore, if $p_i \geq p_j$, then $r_i < r_j$. Accordingly, symbols with higher probability has a smaller rank. Similarly, a corresponding backward LUT B(·) may be present at the decoder that maps the ranks to symbols: $s_i = B(r_i)$.

Accordingly, default ranks (i.e., the ranks of the symbols before modification) may be grouped together based on the default prefix-suffix codes as shown in the table in FIG. 2. Such default prefix-suffix codes may be known as the exponential Golomb codes, and the probability of group g may be represented by $P_g$, such that, $P_g = \Sigma_{s_i \in g} p_i$. Therefore, probability $P_g$ refers to the probability (or frequency of occurrence) of the symbols that are in group g.

As shown in the codebook in FIG. 2, the default (or implied) order of the group probabilities is: $P_0, P_1, P_2, P_3, P_4, P_5, P_6, P_7$, wherein the probabilities are assumed to be in a decreasing order. However, according to the test dataset, it is known that the probability of group 4 is actually higher than the probability of group 2 and group 3, such that, $P_0 \geq P_1 \geq P_4 > P_2 > P_3 \geq P_5 \geq P_6 \geq P_7$. Thus, according to one or more embodiments of the present disclosure, the codebook may be modified, and by doing so, the number of bits used by the prefix-suffix codes assigned to the symbols may be reduced while maintaining lossless compression and increasing the compression ratio.

To modify the codebook, according to the one or more embodiments, probability $P_0$ and $P_1$ may be compared in a first pass. If $P_0 \geq P_1$, then there is no probability inversion. Because it is known here from the training dataset that $P_0$ is greater than $P_1$, the groups are indeed ranked in an appropriate (or desired) order because the probabilities $P_0$ and $P_1$ are in a decreasing order. Next, $P_1$ and $P_2$ may be compared during the first pass. If $P_1 \geq P_2$, then there is no probability inversion. Again, because it is known here from the training dataset that $P_1$ is greater than $P_2$, the groups are indeed ranked in an appropriate (or desired) order because the probabilities $P_1$ and $P_2$ are in a decreasing order. The same process may be applied to probabilities $P_2$ and $P_3$ and again, there is no probability inversion because probabilities $P_2$ and $P_3$ are in a decreasing order. Finally, when probabilities $P_3$ and $P_4$ are compared, $P_4 > P_3$ and therefore probability inversion is present. When probability inversion is present, i.e., the probabilities for group 3 and group 4 are not in the appropriate (or desired) order because probabilities $P_3$ and $P_4$ are in an increasing order. Therefore, the prefixes of group 3 and group 4 are swapped and this information is updated (or stored) in the codebook as shown in the table in FIG. 3. Accordingly, the prefix for group 3, which was previously 1110 is now 11110, and the prefix for group 4, which was previously 11110 is now 1110. As a consequence of the reordering, the probabilities are now arranged as $P_0, P_1, P_2, P_4, P_3, P_5, P_6, P_7$. The first pass is continued to be performed, now by comparing probabilities $P_3$ and $P_5$, and then comparing probabilities $P_5$ and $P_6$, and finally comparing $P_6$ and $P_7$. Because these probabilities are in decreasing order, there is no probability inversion and no further swapping or reordering of the group prefixes are performed. In the present disclosure, the terms "inversion" or "probability inversion" may be defined as a condition when given Px and Py, where Px>Py but Px appears after Py in a given string of probabilities.

Next, a second pass is performed by repeating the above process starting with the first probability. In other words, using the updated codebook illustrated in FIG. 3 as the starting point where the probabilities are arranged as $P_0, P_1, P_2, P_4, P_3, P_5, P_6, P_7$, the probabilities are compared. Thus, probability $P_0$ and $P_1$ may be compared in a second pass. If $P_0 \geq P_1$, then there is no probability inversion. Because it is known here from the training dataset that $P_0$ is greater than $P_1$, the groups are indeed ranked in an appropriate (or desired) order because the probabilities $P_0$ and $P_1$ are in a decreasing order. Next, $P_1$ and $P_2$ may be compared during the second pass. If $P_1 \geq P_2$, then there is no probability inversion. Again, because it is known here from the training dataset that $P_1$ is greater than $P_2$, the groups are indeed ranked in an appropriate (or desired) order because the probabilities $P_1$ and $P_2$ are in a decreasing order. Next, probability $P_2$ is compared with probability $P_4$. Here, because it is known that $P_4 > P_2$, probability inversion is present. Therefore, the prefixes of group 2 and group 4 are swapped and this information is further updated (or stored) in the codebook as shown in the table in FIG. 4. Accordingly, the prefix for group 2, which was previously 110 is now 1110, and the prefix for group 4, which was previously 1110 is now 110. As a consequence of the reordering, the probabilities are now arranged as $P_0, P_1, P_4, P_2, P_3, P_5, P_6, P_7$. The second pass is continued to be performed, now by comparing probabilities $P_2$ and $P_3$, then comparing probabilities $P_3$ and $P_5$, then comparing probabilities $P_5$ and $P_6$, and finally comparing $P_6$ and $P_7$. Because these probabilities are in decreasing order, there is no probability inversion and no further swapping or reordering of the group prefixes are performed.

Accordingly, in one or more embodiments of the present disclosure, a modified example codebook is illustrated in FIG. 4. As a result of the modification, whereas the group 2 symbols included 6-bits (i.e., 3 prefix bits and 3 suffix bits) in the default codebook, group 2 symbols now include 7-bit (i.e., 4 prefix bits and 3 suffix bits); whereas the group 3 symbols included 8-bits (i.e., 4 prefix bits and 4 suffix bits) in the default codebook, group 3 symbols now include 9-bit (i.e., 5 prefix bits and 4 suffix bits); and whereas the group 4 symbols included 10-bits (i.e., 5 prefix bits and 5 suffix bits) in the default codebook, group 4 symbols now include 8-bit (i.e., 3 prefix bits and 5 suffix bits). Based on the probabilities provided by the training dataset, this new codebook may be utilized for encoding and the overall number of bits that will be used for such encoding may be reduced.

It should be noted that the above steps are provided as an example method for generating a new codebook based on the training dataset provided, and also based on the prefix-suffix encoding method (e.g., Golomb entropy encoding). Therefore, similar methods may be applicable when other training datasets are provided wherein frequency of occurrences of the symbols are different than the example described above. In some embodiments, the default codebook may be modified by utilizing Huffman coding techniques to generate new prefixes based on group probabilities. As a result, the modified codebook generated may be a hybrid of exponential Golomb codes that make up the suffixes and Huffman codes that make up the prefixes. An example of such codebook is shown in FIG. 5. Because of the complexity of the Huffman coding prefixes, they are not as decoder friendly as is the case with the truncated exponential Golomb code. Accordingly, the methods described herein may be applied to various prefix-suffix entropy coding techniques to achieve improved lossless data compression.

FIG. 6 is a flow chart illustrating a method for modifying the codebook according to one or more embodiments of the present disclosure. The method may include a processor in a system (e.g., a computer system) that receives probabilities of symbols from a sample dataset (602). This may occur during a programming process of the system when it is being manufactured. The dataset may be a training dataset having symbols with known probabilities. In other words, the frequency of occurrence (or the probability of occurrence) of the symbols in the dataset is known so that this known probability may be utilized, according to the one or more embodiments of the present disclosure to modify or update an existing or default codebook so that the modified codebook is more optimized based on actual probability distribution of the symbols that will utilize this codebook.

In one or more embodiments, the processor may next compute a group probability for each group of symbols in a first codebook (e.g., the default codebook) based on the received symbol probabilities (604). That is, the probability of occurrence of all of the symbols within each group may be added to determine the group probability for that particular group. In other words, the group probability is computed by summing the symbol probabilities in a particular group of symbols. Next, the processor may determine whether or not an inversion is present by determining that a first group probability of a first group in the first codebook is lower than a second group probability of a second group in the first codebook (606). That is, the group probability (which is computed from the symbol probabilities) for the group that is ranked first in the default codebook is compared against the group probability for the group that is ranked next (e.g., ranked second) in the default codebook. An inversion does not exist if the group probability of the first group is higher than the group probability of the second group. If so, the group ranking is correct and no further steps need to be taken. However, an inversion is present if the group probability of the first group is lower than the group probability of the second group, and a rank of the first group is lower (or smaller rank value) than a rank of the second group. When this determination is made, the processor may swap a first prefix corresponding to the first group with a second prefix corresponding to the second group (608). That is, when an inversion is present, the prefix of a prefix-suffix codeword for the first group may be swapped with the prefix of the prefix-suffix codeword for the second group, thereby forming a new (or updated) codeword. Once the prefixes are swapped, the processor may store the first prefix corresponding to the second group and the second prefix corresponding to the first group in a second codebook (e.g., an updated or modified codebook) (608). In one or more embodiments, the modified codebook may be stored in an encoder so that the codebook may be utilized when encoding symbols. Yet in other embodiments, the modified codebook may be stored in a decoder so that the codebook may be utilized when decoding codewords that were encoded by the encoder.

In one or more embodiments, the process for determining whether or not there is an inversion may be repeated for all of the remaining groups in the modified codebook, and then continue to update the codebook whenever there is an inversion by swapping the prefixes. Therefore, the processor may determine, after swapping the first prefix corresponding with the first group with the second prefix corresponding with the second group, that another inversion is present in the partially modified codebook wherein the first group probability of the now second group is lower than a third group probability of a third group in the partially modified codebook, and then swap the first prefix corresponding to the second group with a third prefix corresponding to the third group. This process may be repeated until there are no more inversions before the codewords with the modified prefixes are stored in the codebook in the encoder and/or the decoder. Accordingly, a system may be manufactured by storing the modified codebook in the encoder and/or the decoder that is more optimized based on actual probability distribution of the symbols that are utilized by the system. Therefore, the encoder may utilize the codebook to convert the symbols to codewords, and the codewords may be transmitted to a receiver. The receiver may then take the received codewords and utilize the same codebook that is stored in the decoder and use the codebook to decode the codewords to symbols so that the system can utilize the received data. It should also be noted that the same modified codebooks are implemented in the encoder and the decoder so that the decoder is able to decode the codewords that are encoded by the encoder.

Figure 7:
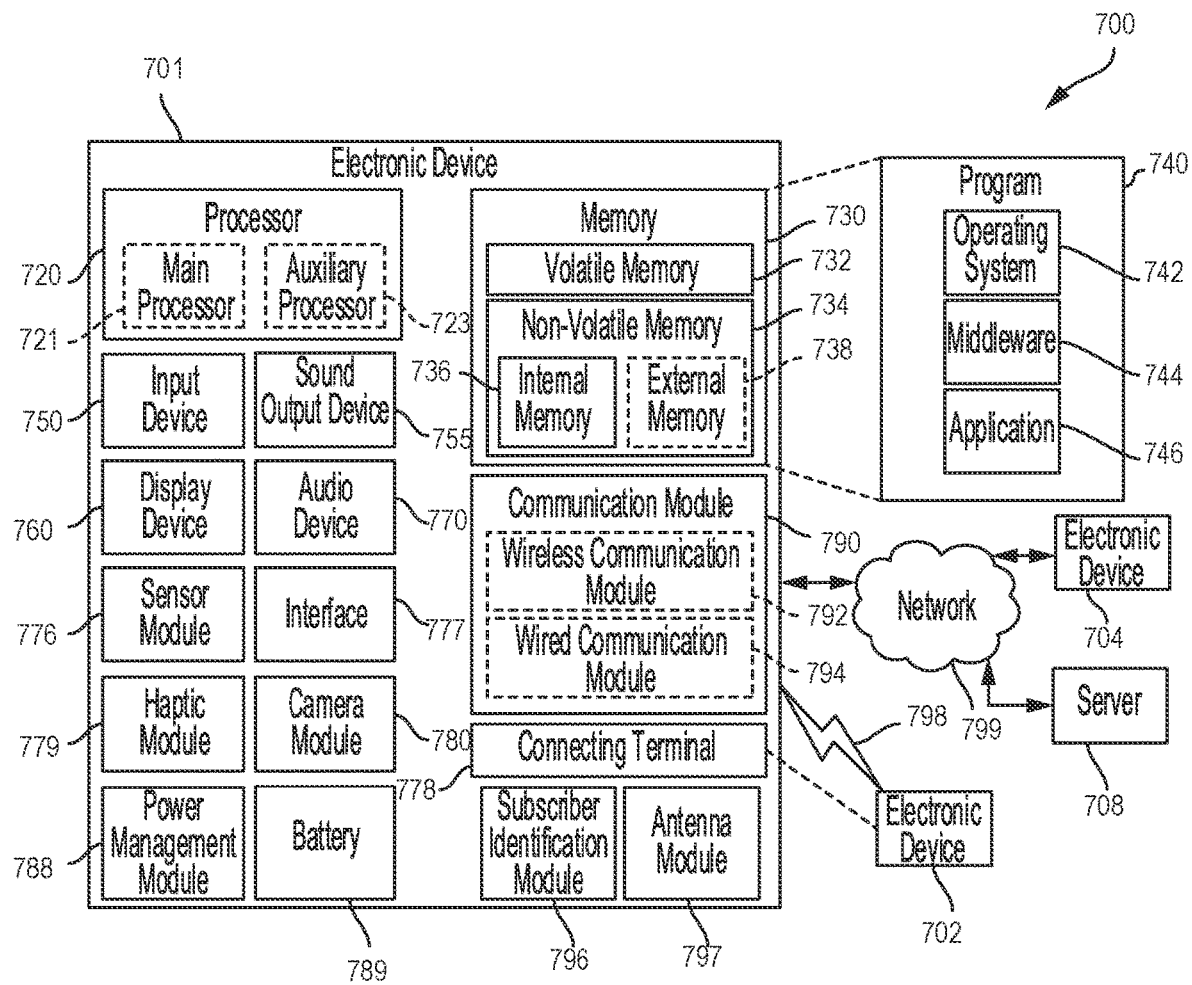
FIG. 7 is a block diagram of an electronic device in a network environment, according to an embodiment.

FIG. 7 is a block diagram of an electronic device in a network environment 700, according to an embodiment.

Referring to FIG. 7, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) card 796, or an antenna module 797. In one embodiment, at least one (e.g., the display device 760 or the camera module 780) of the components may be omitted from the electronic device 701, or one or more other components may be added to the electronic device 701. Some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute software (e.g., a program 740) to control at least one other component (e.g., a hardware or a software component) of the electronic device 701 coupled with the processor 720 and may perform various data processing or computations.

As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). The auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734. Non-volatile memory 734 may include internal memory 736 and/or external memory 738.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. The display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. The audio module 770 may obtain the sound via the input device 750 or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. The interface 777 may include, for example, a high-definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. The connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. The haptic module 779 may include, for example, a motor, a piezoelectric element, or an electrical stimulator.

The camera module 780 may capture a still image or moving images. The camera module 780 may include one or more lenses, image sensors, image signal processors, or flashes. The power management module 788 may manage power supplied to the electronic device 701. The power management module 788 may be implemented as at least part of, for example, a power management integrated circuit (PMIC).

The battery 789 may supply power to at least one component of the electronic device 701. The battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. The communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as BLUETOOTH™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. The antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

Commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

Figure 8:
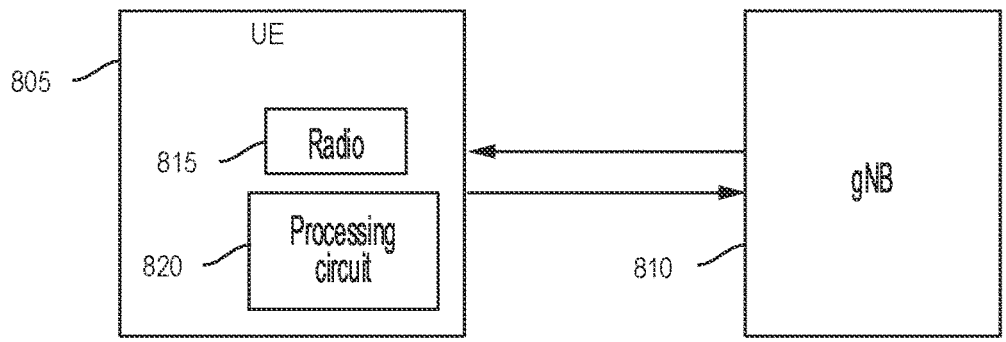
FIG. 8 shows a system including a UE and a gNB in communication with each other.

FIG. 8 shows a system including a UE 805 and a gNB 810, in communication with each other. The UE may include a radio 815 and a processing circuit (or a means for processing) 820, which may perform various methods disclosed herein, e.g., the method illustrated in FIG. 6. For example, the processing circuit 820 may receive, via the radio 815, transmissions from the network node (gNB) 810, and the processing circuit 820 may transmit, via the radio 815, signals to the gNB 810.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method, comprising:
   receiving, by a processor, symbol probabilities from a dataset;
   computing, by the processor, a group probability for each group of symbols in a first codebook based on the received symbol probabilities;
   determining, by the processor, that a first group probability of a first group in the first codebook is lower than a second group probability of a second group in the first codebook;
   swapping, by the processor, a first prefix corresponding to the first group with a second prefix corresponding to the second group in response; and
   storing, by the processor, the first prefix corresponding to the second group and the second prefix corresponding to the first group in a second codebook.

2. The method of claim 1, wherein the second codebook is a modified codebook in an encoder, the method further comprising entropy encoding a symbol based on the modified codebook in the encoder.

3. The method of claim 1, wherein a rank of the first group is lower than a rank of the second group.

4. The method of claim 1, wherein the second codebook is a modified codebook in a decoder, the method further comprising decoding an entropy encoded codeword based on the modified codebook in the decoder.

5. The method of claim 1, wherein as a consequence of the swapping, the first prefix corresponds to the second group and the second prefix corresponds to the first group.

6. The method of claim 5, further comprising:
determining, after the swapping the first prefix corresponding with the first group with the second prefix corresponding with the second group, that the first group probability of the second group is lower than a third group probability of a third group in the second codebook; and
swapping the first prefix corresponding to the second group with a third prefix corresponding to the third group in response.

7. The method of claim 6, wherein a rank of the second group is lower than a rank of the third group.

8. The method of claim 1, wherein the first codebook comprises prefix-suffix codewords corresponding to symbols.

9. The method of claim 1, wherein the dataset is a training dataset comprising known symbol probabilities, and the received symbol probabilities comprise the known symbol probabilities.

10. A system comprising:
a memory; and
a processor configured to execute instructions stored in the memory to perform operations comprising:
receiving symbol probabilities from a dataset;
computing a group probability for each group of symbols in a first codebook based on the received symbol probabilities;
determining that a first group probability of a first group in the first codebook is lower than a second group probability of a second group in the first codebook; and
swapping a first prefix corresponding to the first group with a second prefix corresponding to the second group in response; and
storing the first prefix corresponding to the second group and the second prefix corresponding to the first group in a second codebook.

11. The system of claim 10, wherein the second codebook is a modified codebook in an encoder, the operations further comprising entropy encoding a symbol based on the modified codebook in the encoder.

12. The system of claim 10, wherein a rank of the first group is lower than a rank of the second group.

13. The system of claim 12, wherein the second codebook is a modified codebook in a decoder, the operations further comprising decoding an entropy encoded codeword based on the modified codebook in the decoder.

14. The system of claim 10, wherein as a consequence of the swapping, the first prefix corresponds to the second group and the second prefix corresponds to the first group.

15. The system of claim 14, wherein the operations further comprise:
determining, after the swapping the first prefix corresponding with the first group with the second prefix corresponding with the second group, that the first group probability of the second group is lower than a third group probability of a third group in the second codebook; and
swapping the first prefix corresponding to the second group with a third prefix corresponding to the third group in response.

16. The system of claim 15, wherein a rank of the second group is lower than a rank of the second group.

17. The system of claim 10, wherein the first codebook comprises prefix-suffix codewords corresponding to symbols.

18. The system of claim 10, wherein the dataset is a training dataset comprising known symbol probabilities, and the received symbol probabilities comprise the known symbol probabilities.

19. A non-transitory computer-readable medium storing instructions that, when executed by a processor, cause the processor to perform a method comprising:
receiving symbol probabilities from a dataset;
computing a group probability for each group of symbols in a first codebook based on the received symbol probabilities;
determining that a first group probability of a first group in the first codebook is lower than a second group probability of a second group in the first codebook;
swapping a first prefix corresponding to the first group with a second prefix corresponding to the second group in response; and
storing the first prefix corresponding to the second group and the second prefix corresponding to the first group in a second codebook.

20. The non-transitory computer-readable medium of claim 19, wherein as a consequence of the swapping, the first prefix corresponds to the second group and the second prefix corresponds to the first group, the method further comprising:
determining, after the swapping the first prefix corresponding with the first group with the second prefix corresponding with the second group, that the first group probability of the second group is lower than a third probability of a third group in the second codebook; and
swapping the first prefix corresponding to the second group with a third prefix corresponding to the third group in response.

* * * * *